DATA PROCESSING APPARATUS

Filed March 27, 1959

INVENTORS:
John E. Mekota Jr.
and Aaron P. Dornbusch,

BY Bair, Freeman & Molinare

ATTORNEYS.

United States Patent Office 3,019,417
Patented Jan. 30, 1962

3,019,417
DATA PROCESSING APPARATUS

Aaron P. Dornbusch, Waban, and John E. Mekota, Jr., Belmont, Mass., assignors to Minneapolis-Honeywell Regulator Company, Minneapolis, Minn., a corporation of Delaware Filed Mar. 27, 1959, Ser. No. 802,461
6 Claims. (Cl. 340—172.5)

This invention relates generally to new and improved data processing apparatus, and more particularly to a weight count check circuit for supervising the accuracy of the data processing in such apparatus.

In many types of data processing apparatus, it is convenient to represent digital information in groups of time spaced bits or pulse positions in which there is an electrical pulse for each bit representing the binary zero. These groups, sometimes referred to as machine words, are processed and transferred from one place to another in the machine many times during each data processing operation.

One known way of checking the accuracy of a machine operation is to append to each machine word a satellite number or weight count which is characteristic of the number and position of the bits comprising the machine word. A representative weight count checking circuit is disclosed in the patent to R. M. Bloch, 2,634,052, issued April 7, 1953. As disclosed in this patent, any failure in the data processing machine to transfer information properly results in a weight count check error and in the generation of an error signal to indicate the machine failure.

It is a general object of this invention to provide a new and improved weight count check circuit for use in a data processing machine.

More particularly, it is an object of this invention to provide such a weight count circuit adapted to check machine words which are being processed in either a forward or reverse direction, and which may be in a complemented or uncomplemented form.

In accordance with a feature of one illustrative embodiment of the invention, the weight count check circuit comprises a unique arrangement of magnetic core logic circuits adapted to operate with a modulo weight count reduction, which advantageously may be modulo 3 or any multiple of 3. It is known to reduce the number of digits in the weight count by modifying the latter in accordance with the rules of modulo addition such that when the ones bearing digits are formed in accordance with their arbitrarily assigned weights, all columns of the sum in excess of a selected number are discarded. In the modulo 3 circuit arrangement of the illustrative embodiment of the invention, all sums equal to 3 and the even multiples thereof are discarded from the sum of the weighted bits in the information word. For example, if the sum of the weighted bits in the information word is 38, the weight count would be 38 reduced modulo 3, thereby resulting in the weight count of 2.

It is another object of this invention to provide a new and improved modulo 3 check circuit in which the information word may be processed into the check circuit in either a forward or reverse direction.

It is a still further object of this invention to provide a new and improved modulo 3 weight count check circuit comprising magnetic core logic.

It is still another object of this invention to provide a modulo 3 weight count check circuit, as described above, wherein the magnetic core logic takes the form of a repetitive subtraction and detector circuit. In accordance with a further feature of the invention, the subtraction circuit provides repetitive subtraction of each group of four digits in the machine word, including the transfer weight count digits. If the machine word has been processed correctly, the output of the repetitive subtraction circuit will be equal to one of a plurality of different predetermined words. In the illustrative embodiment further described below there are only five correct words and the magnetic core logic is arranged to detect these five such predetermined words. Thus, as the output is applied from the subtraction circuit to the transfer weight count detector, the magnetic core logic serves to indicate the presence of any one of these five predetermined words. Accordingly, if one of the five predetermined words is detected, the detector logic will indicate that a correct machine transfer has been made. If, on the other hand, the detector logic fails to detect one of the five predetermined words from the output of the repetitive subtraction circuit, an error signal will be generated to indicate the presence of an error in the machine processing. Should such an error signal be generated, it may be used to stop the data processing, to initiate a recycling operation, or to initiate some other correction procedure.

It is still another object of this invention to provide a new and improved weight count check circuit, as described above, which is characterized by its relative simplicity, its efficiency, and its extreme flexibility of operation.

The above and other various features of novelty which characterize the invention are pointed out with particularity in the claims annexed to and forming a part of this specification. For a better understanding of the invention, its advantages and specific objects attained by its use, reference is had to the accompanying drawing and descriptive matter in which is shown and described an illustrative embodiment of the invention.

Figure 1:
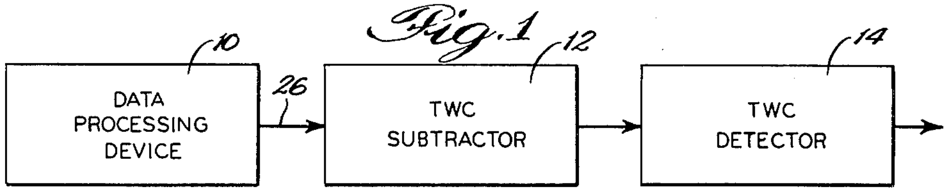
FIGURE 1 is a block diagram of an illustrative transfer weight count system for checking the accuracy of operations in a data processing machine embodying the principles of the present invention.

Referring now to the drawing, and more particularly to the block diagram shown in FIGURE 1 thereof, there is illustrated a transfer weight count system in accordance with the invention. The numeral 10 identifies a suitable data processing device which serves as a source of the data to be checked. For purposes of illustration, the data processing device 10 can take the form of a magnetic tape, an input register, or any other storage medium wherein the machine words may be held until they are required for the checking operation. In one advantageous use of the invention, the data processing device 10 may take the form of a magnetic tape in a file reference unit of the type wherein the machine words are processed in either a forward or a reverse direction, and wherein the machine words may be processed in either their complemented or uncomplemented form.

Although the machine words may be of any desired length, advantageously, in the file reference unit referred to above, the information arriving at the transfer weight count checking circuit from the magnetic tape may be 52 bits in length in which 48 of the bits are information bits, and the remaining 4 bits are weight count bits. As stated above, the transfer weight check circuit of the instant invention advantageously operates with the weight count of the information words reduced modulo 3 or a multiple of 3, and any suitable apparatus for effecting this reduction as the information words are applied to the transfer weight count subtraction circuit 12 may be provided to the output of the data processing device 10.

As stated above, it is a feature of this invention that the machine words may be processed in either a forward or reverse direction, and wherein the words are in a complemented or uncomplemented form. In the event that the information data is being processed in its uncomplemented form, then the weight count bits appended thereto are complemented by suitable circuitry in a known manner before being applied to the subtraction circuit 12 from the data processing device 10 over input line 26. If the data is applied to the subtraction circuit 12 in its complemented form, then the weight count may come in to the subtraction circuit in its uncomplemented form.

The machine words with the weight count reduced modulo 3 or a multiple of 3, as set forth above, are applied from the data processing device 10 to the magnetic core transfer weight count subtraction circuit 12, in multibit groups of four bits each. In accordance with a feature of this invention, each group of 4 bits, including the transfer weight count in the machine word, is applied in sequential fashion to the transfer weight count subtraction circuit 12 and each such group of bits is subtracted from the previously computed difference bits resulting from the prior successive subtractions. These difference bits, which are present at the output of the weight count transfer subtraction circuit 12, are also fed back to the subtraction circuit input by means of a suitable feed-back circuit to permit the subsequent subtraction operation with the next incoming group of four bits to take place.

The output of the weight count subtraction circuit 12 is applied to the transfer weight count detector 14. As explained in greater detail below, detector 14 comprises a plurality of magnetic core logic circuits adapted to detect the presence of any one of a plurality of predetermined words which in the instant illustrative embodiment total five in number. Thus, at the end of a repetitive subtraction operation, the presence of one of the five predetermined words in the resultant difference word at the subtraction circuit output indicates a correct machine word processing operation. If, however, the resultant difference word does not match one of the five predetermined words which the transfer weight count detector 14 is adapted to detect, a processing error is indicated and an error signal will be generated to call the operator's attention to this error. Conveniently, the error signal can be used to energize suitable error indicating lights, and if desired, to stop the machine operation, initiate a recycling operation or initiate some other correction procedure to permit the error to be corrected.

Figures 2, 3:
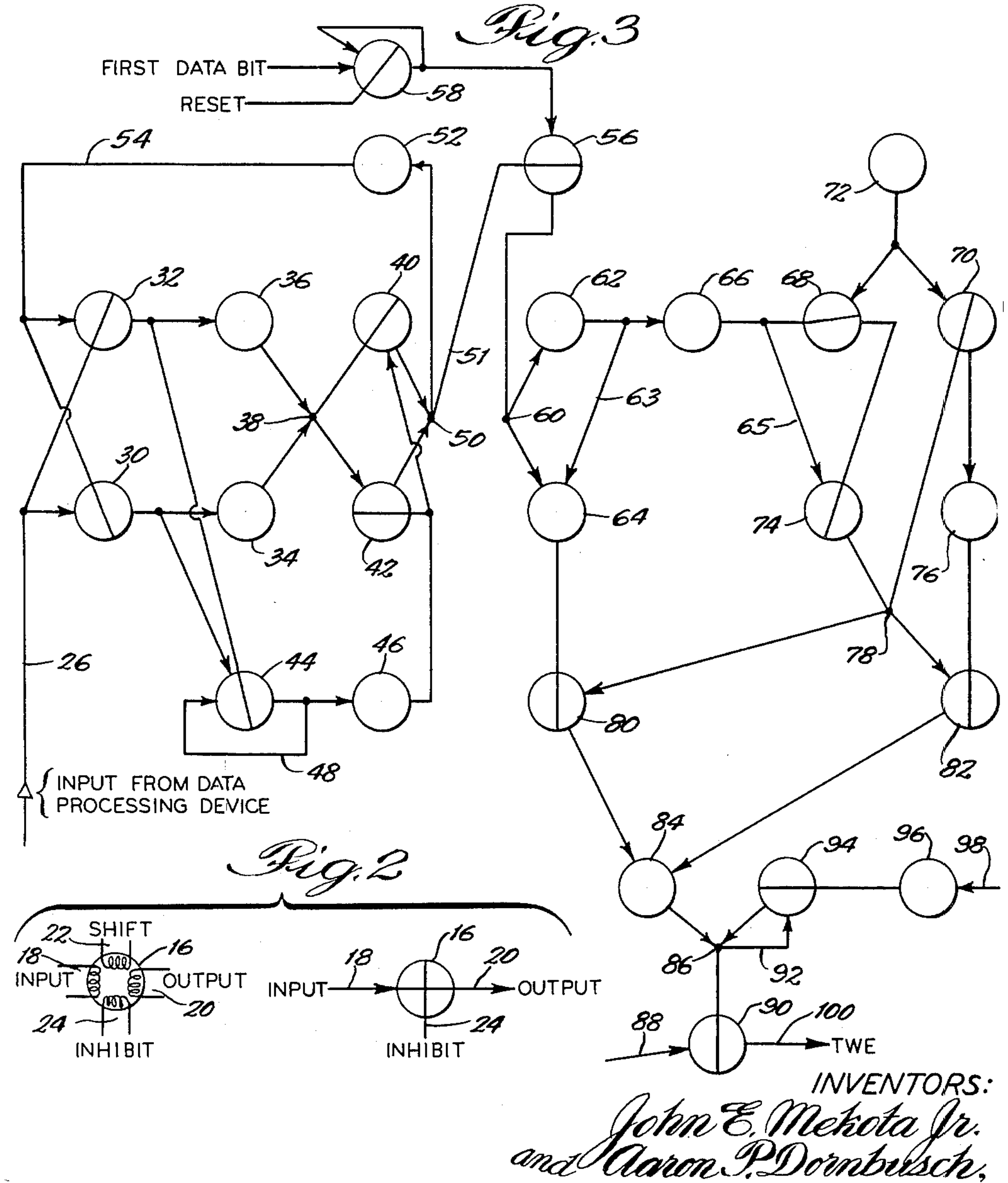
FIGURE 2 is a schematic drawing of an illustrative magnetic core circuit which advantageously may be used in the invention, and further illustrating the logical symbols representative of such magnetic core circuits.
FIGURE 3 is a logical schematic diagram of a transfer weight count subtraction circuit and a transfer weight count detector circuit suitable for use in the system of FIGURE 1.

In the weight count logic circuits comprising the invention, it has been found advantageous to utilize bistable magnetic cores of the type having a rectangular hysteresis loop characteristic. FIGURE 2 shows an illustrative magnetic core stage such as that disclosed in the co-pending application of E. M. Ziolkowski, Serial No. 645,839, filed March 13, 1957, now Patent No. 2,981,934, issued April 25, 1961, which may be used with advantage in the present invention. This illustrative magnetic core stage comprises a magnetic core 16 upon which is wound a pair of input windings 18 and 24, an output winding 20, and a shift winding 22. In the illustrative embodiment of this invention, input winding 18 serves as an enabling winding and input winding 24 serves as an inhibit winding. As will be apparent from the description of the FIGURE 3 circuit, the need for an inhibit winding 24 is not present on all of the magnetic cores included in the transfer weight count check system.

Magnetic cores of the type shown in FIGURE 2 are characterized by two stable states of operation, and therefore, they readily lend themselves for use in logical circuitry employing binary notation. These magnetic cores have been shown in customary logical symbols in FIGURE 3, and the relationship between the components of the magnetic core and such logical symbols is clearly shown in FIGURE 2 of the drawing. The inhibit winding 24 of the core 16 symbolically is shown as a line extending through the core and, as well known in the art, this inhibit winding when activated, serves to prevent the core from switching from one stable state to the other. The detailed discussion of this type of circuit and the various ways in which it may be implemented is found in an article by S. Guterman et al., entitled Logic and Control Functions Performed With Magnetic Cores, Proceedings of the IRE, March 1955.

Referring now to the symbolic logic circuit diagram of FIGURE 3, it can be seen that the four bit digit groups in the machine word which are to be repetitively subtracted are applied to the transfer weight count subtraction circuit 12 from the data processing device 10 by means of the input line 26. These four bit digit groups to be subtracted are fed serially to the enabling input winding of the input magnetic core 30, and the four bit digit groups representing the difference digits at the output of the transfer weight count subtraction circuit 12 are fed over the feed-back line 54 to the enabling winding of the input core 32. The input digits to be subtracted and the difference digits from the output of the subtraction circuit also are applied to the inhibit windings of the input cores 32 and 30, respectively, such that the presence of a binary one digit at either input core serves to inhibit the switching action of the other input core.

The output windings of the input magnetic cores 30 and 32 are connected to the enabling windings of a pair of buffer magnetic cores 34 and 36, respectively, and to the enabling input winding and inhibit input winding respectively, of a non-binary flip-flop or storage magnetic core 44 in the borrow circuit. Thus, a binary one digit at the output of magnetic core 32 serves to inhibit the ones generator core 44, while a binary one digit at the output of magnetic core 30 serves to apply a pulse into the borrow circuit.

The output windings of buffer cores 34 and 36 are connected to the common junction 38 which in turn, is connected to the enabling input winding of output core 42 and to inhibit input winding of output core 40.

The output winding of the storage core 44 in the carry circuit is connected by means of feed-back line 48 to the enabling input winding of this core and also to the input winding of buffer core 46, the output of which is connected to the enabling input winding of output core 40 and to the inhibit winding of output core 42. Thus, a borrow pulse at the output of buffer core 46 serves to inhibit output core 42, and to set output core 40, provided the latter is not inhibited by a pulse from the common junction 38.

The output of the transfer weight count subtraction circuit 12 is applied over lead 51 to the inhibit winding of the complementing core 56. The enabling input winding of core 56 is connected to the storage core 58 which normally is set to store the fact that a data bit representing a valid one has been received at the core input 56.

Each time a binary one appears on the output lead 51 of the subtraction circuit 12, core 56 is inhibited and each time a binary zero appears on output lead 51, a pulse from the storage core 58 is effective to set core 56. Thus, it can be seen that the output of the complementing core 56 will be the complement of the difference digits at the output of the subtraction circuit 12.

These complemented difference digits are applied to the junction 60 which is connected for simultaneous application to the input cores 62 and 64 of the transfer weight count detector circuit 14. In accordance with an important aspect of this invention, the transfer weight count detector serves to sense the presence of ony one of a plurality of predetermined difference words which may be applied thereto from the transfer weight count subtraction circuit 12. In the instant illustration, as exemplified by FIGURE 3, five such predetermined words may be sensed by the detection circuit. If an error in data processing exists, none of the five predetermined words will be applied to the transfer weight count detector 14 and an error signal will be generated to indicate that an error has taken place in the data processing operation.

The logic of the illustrative transfer weight count detector 14 is such that a relatively few magnetic cores need be provided to detect the presence of any one of the five predetermined words necessary to indicate a correct data processing operation. Thus, the output of detector input core 64 is connected to the inhibit winding of core 80, the output of which is connected through buffer core 84 to the common junction 86. The output of detector core 62 is connected through the lead 63 to an enabling input of core 64, which as stated above, has an output connected to the inhibit winding of core 80. The output of the core 62 also is connected through the buffer core 66 to the inhibit input winding of core 68, and also through the lead 65 to the enabling input winding of core 74.

A ones generator 72, which is a source of a continuous stream of pulses, has its output connected for simultaneous application to an enabling input winding of each of the magnetic cores 68 and 70. The output of core 68 is connected to the inhibit winding of core 74, the output of which is connected to the common logical junction 78. The junction 78 is connected to the inhibit winding of core 70 and to the enabling windings of cores 80 and 82. The output of core 70 is connected through the buffer core 76 to the inhibit winding of core 82, the output of which is connected to the enabling input winding of core 84. The output of core 84 is connected to the junction 86.

During the cyclic operation of the instant weight count check system, a timed pulse appears on line 98, at a designated time period in each cycle, and this pulse is applied through the buffer core 96 to the inhibit winding of core 94. This pulse serves to reset the flip-flop formed by core 94 and clears it in preparation for receipt of valid information from the detector. The output of core 94 is applied to the junction 86, and from this junction through the feed-back line 92, back to an enabling input winding of core 94. Junction 86 is connected to the inhibit winding of core 90 such that the presence of a pulse at junction 86 inhibits core 90 and prevents a signal pulse from being passed from the signal line 88 to the transfer weight error line 100.

As stated above, the transfer weight error line 100 may be connected to a suitable error indicating circuit such as a thyratron which would be fired into conduction to indicate an error whenever no signal is present at junction 86, and the pulse on line 88 is permitted to pass through the core 90. The pulse on line 88 is a sampling pulse which is timed to occur after the processing of a word to insure that the entire word has had a chance to pass through the subtraction and detection circuits.

In accordance with a feature of this invention, the logic of the transfer weight count detector circuit 14 is such that an output signal will be present at the junction 86 whenever the input difference digits to the detector from the subtraction circuit 12 matches one of the five predetermined words characterized by the transfer weight count detector logic. The presence of any one of these five predetermined words causes a signal to be present at junction 86 to inhibit the error core 90. If, however, the output difference digits from the transfer weight count subtraction circuit 12 is not equal to one of the five predetermined words characterized by detector 14, then no signal pulse will be present at junction 86 at the time the pulse arrives over the error input line 88 to set error core 90, and this error signal will be passed to error output line 100 to operate a suitable error indicating device.

In accordance with a further feature of this invention, the repetitive subtraction effected by the transfer weight count subtraction circuit 12 is adapted for use with machine words that are processed in either a forward or backward direction. As stated heretofore, the machine words, including a weight count reduced modulo 3, are applied serially in groups of 4 bits each to the input of the transfer weight count subtraction circuit 12 and each 4 bit digit group is subtracted from the previously computed difference digits fed back from the output of the subtraction circuit 12 to provide a new 4 bit group of difference digits. These machine words may be fed to the subtraction circuit with the modulo 3 weight count at the beginning or at the end of the word since the invention processes words in either a forward or reverse direction.

At the end of the subtracting operation, the resultant 4 bit difference digits are sensed by the transfer weight count detector circuit 14 so that the presence of an error in the data processing operation will be detected if such an error exists. As explained heretofore, the logic of the magnetic cores comprising the transfer weight count detector 14 is such that no error in data processing exists if the resultant difference digits from the subtraction circuit is equal to any one of the five predetermined words which the detector 14 is adapted to detect. If a match exists between the resultant difference digits and any one of these five predetermined words, an output signal will appear at the junction 86 to inhibit the error core 90. If a match does not exist between the resultant difference digits and any one of the five predetermined words which the logic of detector 14 is adapted to detect, then the error core 90 will not be inhibited and the error signal will be passed from the line 88 to the line 100 to operate the associated error indicating device.

In some applications of the invention, a word formed only of zeros may be considered as an invalid word. In accordance with a further feature of this invention, the detector circuit 14 serves to sense such an invalid word and to provide an error indication whenever an all zero word exists. This checking is performed by means of the storage core 58 in FIGURE 3. As explained heretofore, core 58 normally stores the fact that a data bit representing a valid "one" has been received at its enabling input winding. Thus, the input data bit representing a vaild "one" will set core 58. If the core 58 is not set, due to the absence of such a bit, then there will be no output from this core to the core 56 of the detector capable of providing the necessary check bits in the detector, and an error will be indicated. The core 58 is reset by a pulse on the reset line after the transfer weight count error circuit is sensed.

In some applications it may be found desirable that a word formed completely of zeros be allowed to pass, and in this event the circuit is arranged to respond to six predetermined words rather than five, as in the illustrative example described above. In such an alternative arrangement, the checking provided by the storage core 58 is not required and the circuitry associated therewith for sensing the presence of the all zero word to indicate an error may be eliminated.

Those skilled in the art now can appreciate that the invention is highly advantageous in the detection of errors in data processing due to the extreme flexibility in checking a machine word being processed in either a fordward or backward direction. This flexibility has been achieved with magnetic core logic circuitry by reducing the machine word weight count modulo 3 or any multiple of 3, and by providing detection circuits adapted to indicate an errorless operation when the difference digits in the output of the repetitive subtraction is equal to any one of the selected determined words characterized by the logic of the detector core circuitry.

It further will be readily understood by those skilled in the art that the specific circuit described above using modulo 3 weight count reduction and detector logic characterized by five predetermined words is merely illustrative of the principles of the instant invention, and that modifications may be made in the construction and arrangement of this specific illustrative embodiment without departing from the real purpose and spirit of the invention. Accordingly, it is intended to cover by the appended claims any modified forms of structure, or use of equivalents which may be reasonably included within their scope.

What is claimed as the invention is:

1. An electrical control circuit for monitoring a data processing function comprising a source of machine words formed of sequentially arranged multi-bit digit groups, said machine words including a multi-bit digit group weight count reduced modulo 3 or a multiple thereof, and being adapted to be read out of said source in either a forward or reverse direction, a subtraction circuit for effecting repetitive subtraction of said multi-bit digit groups wherein each multi-bit digit groups successively applied to said subtraction circuit is subtracted from the subtraction circuit output representing the difference digit resulting from the previous subtractions of the digit groups in said machine word, the number of said repetitive subtractions being determined by the number of multi-bit digit groups in the machine word, a logical detector circuit connected to the output of said subtraction circuit and arranged to detect the presence of any one of a plurality of predetermined digit words received from said subtraction circuit, and error indicating means connected to the output of said logical detector circuit adapted to be energized to indicate an error whenever the subtraction circuit output does not match one of said predetermined digit words.

2. An electrical control circuit in accordance with claim 1 wherein said subtraction circuit and said logical detector circuit comprise bistable elements including magnetic cores having rectangular hysteresis loop characteristics.

3. An electrical control circuit for monitoring a data processing function comprising a source of machine words formed of sequentially arranged multi-bit digit groups, a magnetic core subtraction circuit for effecting repetitive subtraction of the multi-bit digit groups in each word to provide an output group of difference bits, a magnetic core logical detector circuit connected to receive said output group of difference bits from said subtraction circuit and arranged to detect the presence of any one of a plurality of predetermined groups of bits in said output group, and error indicating means connected to the output of said logical detector circuit adapted to be energized to indicate an error whenever the subtraction circuit output group of difference bits does not match one of said predetermined group of bits.

4. A transfer weight count checking circuit for use in a data processing machine comprising a source of machine words formed of sequentially arranged multi-bit digit groups including a weight count digit group reduced modulo 3 or a multiple thereof, a magnetic core computing circuit for effecting a mathematical operation on said multi-bit digit groups to provide an output group of bits, a magnetic core logical detector circuit connected to receive the output group of bits from said computing circuit and arranged to detect the presence of any one of five predetermined groups of bits in the computing circuit output, and error indicating means connected to the output of said logical detector circuit adapted to be energized to indicate an error whenever the computing circuit output does not match any one of said predetermined groups of bits.

5. A transfer weight count checking circuit in accordance with claim 4 wherein said machine words may be applied to said computing circuit from said source in either a forward direction wherein said weight count digit group is applied at the end of said machine word or in a reverse direction wherein said weight count digit group is applied at the beginning of said machine word.

6. A transfer weight count checking circuit for use in a data processing machine comprising a source of bidirectional processed machine words, each formed of sequentially arranged multi-bit digit groups including a weight count group of bits reduced modulo 3 or a multiple thereof, a magnetic core subtraction circuit for effecting repetitive subtraction of said multi-bit digit groups wherein each multi-bit digit group successively applied to said subtraction circuit is subtracted from the previous subtraction circuit output to provide an output group of difference bits, the number of the repetitive subtractions being determined by the number of multi-bit digit groups in the machine word, a magnetic core logical detector circuit connected to the output of said subtraction circuit for sensing the presence of certain predetermined groups of difference bits, and error indicating means connected to the output of said logical detector circuit adapted to be energized to indicate an error whenever the subtraction circuit output group of difference bits does not match any one of said predetermined groups of difference bits which the detector circuit is adapted to detect.

No references cited.